(12) United States Patent
Reuschel

(10) Patent No.: US 9,243,688 B2
(45) Date of Patent: Jan. 26, 2016

(54) METHOD FOR OPERATING AN AUTOMATED DUAL-CLUTCH TRANSMISSION

(71) Applicant: Schaeffler Technologies AG & Co. KG, Herzogenaurach (DE)

(72) Inventor: Michael Reuschel, Ottersweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 527 days.

(21) Appl. No.: 13/762,606

(22) Filed: Feb. 8, 2013

(65) Prior Publication Data

US 2013/0312556 A1 Nov. 28, 2013

Related U.S. Application Data

(63) Continuation of application No. PCT/DE2011/001512, filed on Jul. 26, 2011.

(30) Foreign Application Priority Data

Aug. 12, 2010 (DE) .......................... 10 2010 034 093

(51) Int. Cl.
*F16H 3/08* (2006.01)
*F16H 3/093* (2006.01)
*F16H 57/00* (2012.01)
*F16H 61/688* (2006.01)

(52) U.S. Cl.
CPC ............ *F16H 3/093* (2013.01); *F16H 57/0006* (2013.01); *F16H 61/688* (2013.01); *F16H 2057/0012* (2013.01); *Y10T 74/19233* (2015.01)

(58) Field of Classification Search
None
See application file for complete search history.

(56) References Cited

U.S. PATENT DOCUMENTS

| 6,095,001 | A  | * | 8/2000  | Ruehle et al. .................... 74/331 |
| 7,166,059 | B2 | * | 1/2007  | Reitz et al. ......................... 477/5 |
| 7,587,957 | B2 | * | 9/2009  | Jackson .......................... 74/329 |
| 7,591,203 | B2 | * | 9/2009  | Ochi et al. ...................... 74/331 |
| 7,597,020 | B2 | * | 10/2009 | Baldwin ...................... 74/336 R |
| 7,867,138 | B2 | * | 1/2011  | Earp et al. ...................... 477/175 |
| 8,567,273 | B2 | * | 10/2013 | Mellet et al. .................... 74/331 |
| 8,752,442 | B2 | * | 6/2014  | Hedman et al. ................. 74/330 |

FOREIGN PATENT DOCUMENTS

| DE | 10109662     | 9/2002 |
| DE | 10308698     | 9/2003 |
| DE | 102006008207 | 9/2006 |
| DE | 102006010934 | 9/2006 |
| DE | 102008032757 | 1/2010 |
| EP | 2083198      | 7/2009 |

* cited by examiner

*Primary Examiner* — Dirk Wright
(74) *Attorney, Agent, or Firm* — Simpson & Simpson, PLLC

(57) ABSTRACT

A method for operating an automated dual-clutch transmission having two sub-transmissions, with which shafts are associated, which transmit a/no torque as active/inactive shafts when a sub-clutch is engaged/disengaged and a gear is engaged/disengaged, the size and direction of said torque being dependent on the particular gear that is engaged, wherein even gears are associated with an even shaft and odd gears are associated with an odd shaft. When an odd/even gear is engaged, that is, when the odd/even shaft is active, a gear is also initially engaged on the inactive even/odd shaft, in order to change a critical resonance slip speed.

10 Claims, 1 Drawing Sheet

METHOD FOR OPERATING AN AUTOMATED DUAL-CLUTCH TRANSMISSION

CROSS-REFERENCE TO RELATED APPLICATIONS

This application is filed under 35 U.S.C. §120 and §365(c) as a continuation of International Patent Application No. PCT/DE2011/001512 filed Jul. 26, 2011 and claims priority of German Patent Application No. 10 2010 034 093.6 filed Aug. 12, 2010, which applications are incorporated herein by reference to their entireties.

FIELD OF THE INVENTION

The invention relates to a method for operating an automated dual-clutch transmission having two sub-transmissions, with which shafts are associated, which transmit a/no torque as active/inactive shafts when a sub-clutch is engaged/disengaged and a gear is engaged/disengaged, the size and direction of the torque being dependent on the particular gear that is engaged, wherein even gears are associated with an even shaft and odd gears are associated with an odd shaft.

BACKGROUND OF THE INVENTION

From German published patent application DE 101 09 662 A1 a method is known for controlling a dual-clutch transmission having two sub-transmissions, wherein a forward gear associated with the one sub-transmission and a reverse gear associated with the other sub-transmission are kept constantly engaged.

BRIEF SUMMARY OF THE INVENTION

In dual-clutch systems with dry or wet clutches, vibrations increasingly occur on the transmission input side. This is caused by unwanted clutch juddering. This juddering preferably takes place at the first natural frequency of the drivetrain with the clutch disengaged, and lies for example in a range between three and twenty hertz. The juddering causes chatter vibrations, which are perceptible to a driver and impair driving comfort. The invention proposes various measures to prevent the occurrence of unwanted chatter vibrations as much as possible.

The frequency at which the clutch juddering occurs is dependent in part on whether or which gears are engaged in the dual-clutch transmission. Here, in the dual-clutch transmission, the odd gears 1, 3, 5 are assigned to a shaft that is referred to as the odd shaft. The even gears 2, 4 and 6 are assigned to a different shaft, which is referred to as the even shaft. The shaft on which torque is currently being transmitted is also referred to as the active shaft. By analogy, the shaft without torque transmission is referred to as the inactive shaft.

For example, if the first gear is engaged (odd, active shaft) and the second gear is disengaged (even, inactive shaft), then the juddering frequency is around seven hertz. If, for example, the first gear is disengaged (odd, inactive shaft) and the second gear is engaged (even, active shaft), then the juddering frequency is around thirteen hertz. If both gears are engaged, that is, if neutral is not preselected in any gear, then the juddering frequency is around five hertz. If the first gear is used in this case to drive off slowly, then the odd shaft would be the active shaft. The even shaft assigned to the second gear would be the inactive shaft, even if the second gear is engaged. Engaging both gears reduces the resonant frequency, due to the coupled masses.

In the event of geometric errors, a critical speed differential, that is, a slippage between an engine speed and a transmission input speed can be easily determined from the excitation frequency. In the cases described above, depending on the gear, a resonance slip speed occurs at three hundred revolutions per minute (five hertz), four hundred and twenty revolutions per minute (seven hertz) and seven hundred and eighty revolutions per minute (thirteen hertz). This knowledge is used, according to another aspect of the invention, to optimize the activation strategy of the dual-clutch transmission.

When driving off in first gear, a gear is first engaged on the even but inactive shaft, for example the second gear or the reverse gear. That shifts/reduces the resonance slip speed to three hundred revolutions per minute. At the right moment, before this critical slip speed is reached, the even gear is disengaged.

Fifty to one hundred revolutions per minute are used, for example, as the safety margin Ndiff_safety; that is, the even gear is disengaged at a slip speed of about three hundred and fifty revolutions per minute. That increases the critical slip speed to four hundred and twenty revolutions per minute. Of course, the slip speed has already been reduced to three hundred and fifty revolutions per minute. The slip speed is further reduced by the creep strategy. The difference depends on the natural frequency. The measures described above prevent operation of the creep functionality in the range of the existing drivetrain resonances.

The object of the invention is to prevent unwanted chatter during the operation of an automated dual-clutch transmission.

The object is fulfilled in the case of a method for operating an automated dual-clutch transmission having two sub-transmissions, with which shafts are associated, which transmit a/no torque as active/inactive shafts when a sub-clutch is engaged/disengaged and a gear is engaged/disengaged, the size and direction of the torque being dependent on the particular gear that is engaged, wherein even gears are associated with an even shaft and odd gears are associated with an odd shaft, in that when an odd/even gear is engaged, in other words when the odd/even shaft is active, a gear is also initially engaged on the inactive even/odd shaft, in order to change a critical resonance slip speed. The frequency at which unwanted chatter occurs is dependent in part on whether and which gears are engaged. In the event of geometric errors, the critical resonance slip speed can be determined from the excitation frequency. This knowledge is used, according to an essential aspect of the invention, to optimize the activation strategy.

A preferred exemplary embodiment of the method is characterized in that below/above the critical resonance slip speed the vehicle is always driven without neutral being pre-selected. With neutral not pre-selected, a gear is engaged on the even and the odd shafts.

Another preferred exemplary embodiment of the method is characterized in that above/below the critical resonance slip speed the gear on the inactive shaft is always disengaged. The gear on the active shaft remains engaged.

Another preferred exemplary embodiment of the method is characterized in that when driving off slowly in a first gear, i.e., with the odd shaft active, a gear is also initially engaged on the even shaft, in order to reduce the critical resonance slip speed. The resonance slip speed is reduced by the greater moving mass.

Another preferred exemplary embodiment of the method is characterized in that when driving off slowly in first gear a second gear or a reverse gear is initially engaged on the even shaft, in order to reduce a critical resonance slip speed. Alternatively, a fourth gear may also be engaged. When driving off slowly in first gear, however, within the framework of the present invention it has proven particularly advantageous to engage the second gear or the reverse gear.

Another preferred exemplary embodiment of the method is characterized in that the gear which is initially engaged on the even/odd shaft is disengaged before the critical resonance slip speed is reached. That increases the critical resonance slip speed.

Another preferred exemplary embodiment of the method is characterized in that the gear which is initially engaged on the even/odd shaft is disengaged about fifty to one hundred revolutions before the critical resonance slip speed is reached. That creates an adequate safety margin.

Another preferred exemplary embodiment of the method is characterized in that a target speed is changed in order to avoid ranges with a critical resonance slip speed. In the case of the target speed for the creep algorithm, one refers for example to a transmission input speed. Alternatively, the target speed may also refer to a transmission output speed, or to a vehicle velocity converted to a speed of rotation.

Another preferred exemplary embodiment of the method is characterized in that the critical resonance slip speed is stored in a software element, and is used to obtain a limiting speed. The limiting speed preferably has a safety margin relative to the critical resonance slip speed.

Another preferred exemplary embodiment of the method is characterized in that the target speed is raised at least to the value of the limiting speed. In principle, a lowering of the target speed is also conceivable, for example if a second limiting speed is calculated. The second limiting speed is then lower than the critical resonance slip speed.

BRIEF DESCRIPTION OF THE DRAWINGS

Additional advantages, features and details of the invention can be seen from the following description, in which various exemplary embodiments are described in detail with reference to the drawing. The figures show the following.

DETAILED DESCRIPTION OF THE INVENTION

Figure 1:
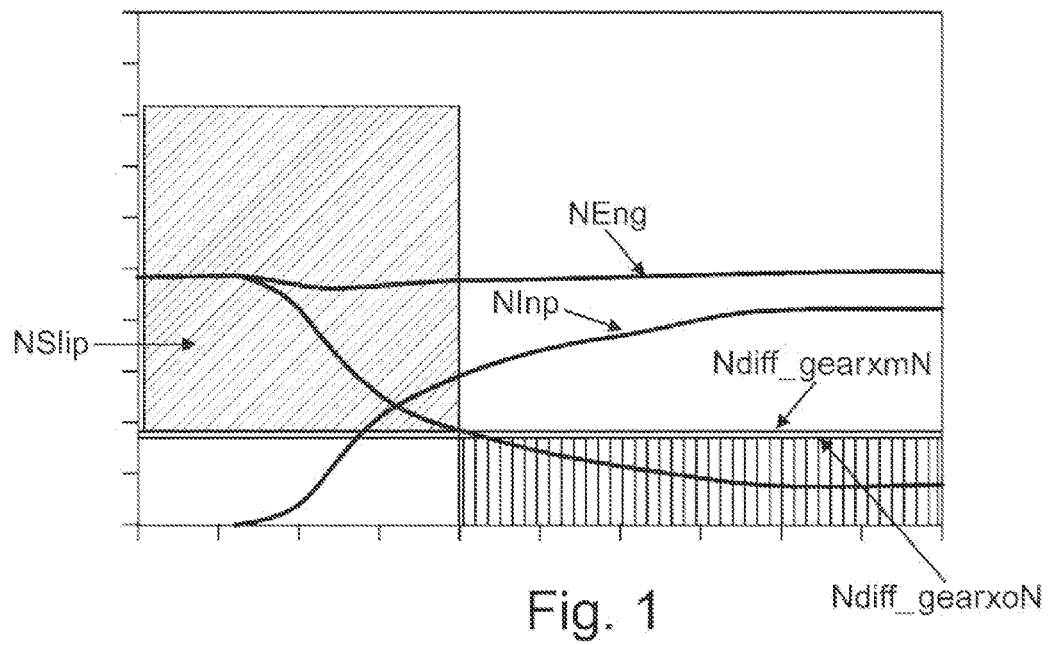
FIG. 1 is an overview of critical speed ranges, on the basis of a Cartesian coordinate diagram; and, FIG. 2 illustrates the adjustment of a target speed when creeping so as to avoid resonances, on the basis of another Cartesian coordinate diagram.

FIG. 1 depicts graphically the previously described circumstances on the basis of a Cartesian coordinate diagram having an x-axis and a y-axis. On the x-axis the time is plotted in one-second steps between four and fourteen seconds. On the y-axis the speed is plotted in revolutions per minute between zero and two thousand in steps of two hundred rpm. A diagonally hatched area corresponds to a slip resonance speed of three hundred revolutions per minute. A vertically lined area corresponds to a slip resonance speed of four hundred and twenty revolutions per minute. At about eight seconds a switchover is made, so that no resonances Occur.

An engine speed is designated as NEng. An input speed is designated as NInp. A slip speed, or resonance slip speed, is designated as NSlip. For each active gear, first of all the critical slip speeds are calculated as follows, with a safety margin Ndiff_safety.

$$N\text{diff,GearxoN} = N\text{SlipResonance(gear, without neutral preselected)} + N\text{diff\_safety}$$

$$N\text{diff,GearxmN} = N\text{SlipResonance(gear, with neutral preselected)} + N\text{diff\_safety}$$

Figure 2:
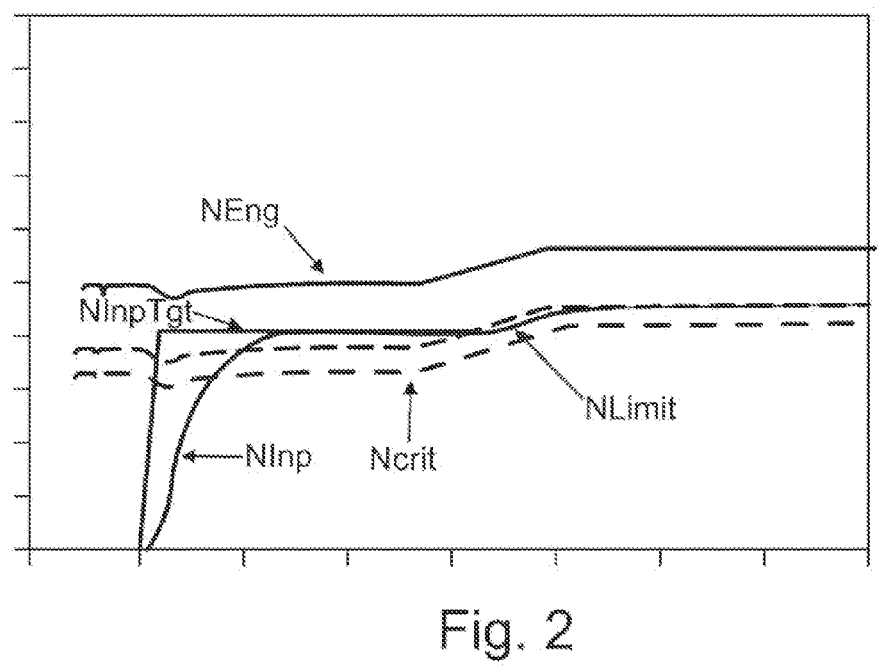

The following applies for operation with/without neutral preselected on the active shaft:

Below a critical speed Ndiff,crit the vehicle is always driven without neutral preselected (gears are engaged on both shafts); above this critical speed neutral is preselected; that is, there the gear of the inactive shaft is disengaged. The following is used to determine the value Ndiff,crit:

If: $(N\text{diff,GearxmN} \geq N\text{diff,GearxoN})$, then $N\text{diff,crit} = N\text{diff,GearxoN}$ If: $(N\text{diff,GearxmN} < N\text{diff,GearxoN})$, then $N\text{diff,crit} = (N\text{diff,GearxmN} - N\text{diff,GearxoN})/2$ An additional improvement regarding the prevention of critical resonance slip speeds can be achieved through appropriate correction/adjustment of a target rotational speed/target velocity when creeping, as indicated in FIG. 2. In FIG. 2 an engine speed is designated with NEng. A target speed is designated with NInpTgt. A limiting speed is designated with NLimit. An input speed is designated with NInp. A critical speed, or critical resonance speed, is designated with NCrit.

In the following description, all of the rotational speeds are in reference to the transmission input speed. Alternatively, all values without limitations can instead also be referenced to the transmission output speed, or a converted vehicle velocity.

The engine speed NEng of an internal combustion engine can assume different idling values depending on the situation (cold operation, operation with air conditioning, etc.). This can result in the fixed target speed NInpTgt for the velocity regulation when creeping in the range of a critical resonance speed NCrit.

According to the invention, it is now proposed that the critical resonance speeds are avoided in the software by changing the target speed NinpTgt. This is done by first storing the critical resonance slip speeds NSlipResonance (Gear) for each gear in the software. From these a limiting speed NLimit is then calculated, which also has a certain safety margin Nmin relative to the resonance speed:

$$N\text{Limit} = N\text{Eng} - N\text{SlipResonance(Gear)} + N\text{min}$$

$$N\text{Crit} = N\text{Eng} - N\text{SlipResonance(Gear)}$$

During operation it is now possible to test whether the target speed NinpTgt is below the calculated limiting speed NLimit. If this is the case, the target speed is increased to at least the value of this limiting speed (FIG. 2). An adjustment to NLimit (increase) is always favorable here, so as not to simultaneously increase the demand on the clutch unnecessarily.

In principle, a lowering is also conceivable, however, because a second limiting speed NLimit2 can also be calculated:

$$N\text{Limit} = N\text{Eng} - N\text{SlipResonance(Gear)} - N\text{min}$$

The second limiting speed is then lower than the resonance speed. However, the second limiting speed has increased slip speeds, which can have a detrimental effect on the clutch life.

REFERENCE VARIABLES

NEng=engine speed
NInp=input speed
NSlip=resonance slip speed
Ndiff_GearxmN=critical slip speed without neutral preselected
Ndiff_GearxoN=critical slip speed with neutral preselected NInpTgt=target speed
NLimit=limiting speed
NCrit=resonance speed

What is claimed is:

1. A method for operating an automated dual-clutch transmission having two sub-transmissions with which shafts are associated, which transmit a/no torque as active/inactive shafts when a sub-clutch is engaged/disengaged and a gear is engaged/disengaged, respectively, the size and direction of said torque being dependent on the particular gear that is engaged, wherein even gears are associated with an even shaft and odd gears are associated with an odd shaft, wherein when an odd/even gear is engaged, in other words when the odd/even shaft is active, a gear is also initially engaged on the inactive even/odd shaft, respectively, in order to change a critical resonance slip speed.

2. The method recited in claim 1, wherein below/above the critical resonance slip speed the vehicle is always driven without neutral being pre-selected.

3. The method recited in claim 1 wherein above/below the critical resonance slip speed the gear on the inactive shaft is always disengaged.

4. The method recited in claim 1 wherein when driving off slowly in a first gear, i.e., with the odd shaft active, a gear is also initially engaged on the even shaft, in order to reduce the critical resonance slip speed.

5. The method recited in claim 4 wherein when driving off slowly in first gear a second gear or a reverse gear is initially engaged on the even shaft, in order to reduce a critical resonance slip speed.

6. The method recited in claim 1 wherein the gear which is initially engaged on the even/odd shaft is disengaged before the critical resonance slip speed is reached.

7. The recited in claim 6 wherein the gear which is initially engaged on the even/odd shaft is disengaged about fifty to one hundred revolutions before the critical resonance slip speed is reached.

8. The method recited in claim 1 wherein a target speed is changed in order to avoid the critical resonance slip speed.

9. The method recited in claim 8 wherein the critical resonance slip speed is stored in a software element, and is used to obtain a limiting speed.

10. The method recited in claim 9 wherein the target speed is raised at least to the value of the limiting speed.

* * * * *